United States Patent [19]
Kamata et al.

[11] Patent Number: 6,128,441
[45] Date of Patent: *Oct. 3, 2000

[54] WATERPROOF CASE FOR CAMERA

[75] Inventors: Shigeyuki Kamata, Miyagi-ken; Takashi Narasawa, Kanagawa-ken, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/458,233

[22] Filed: Jun. 2, 1995

Related U.S. Application Data

[63] Continuation of application No. 08/166,806, Dec. 13, 1993, abandoned, which is a continuation of application No. 07/815,079, Dec. 30, 1991, abandoned.

[30] Foreign Application Priority Data

Jan. 14, 1991 [JP] Japan ................................. 3-015942

[51] Int. Cl.[7] .................................................. G03B 17/24
[52] U.S. Cl. .................................. 396/25; 396/27; 396/56; 348/81
[58] Field of Search ............................ 354/64, 266, 288; 396/25, 27, 29, 263, 535, 56–59; 348/81, 373, 375, 221, 222; 206/316.1, 316.2; 220/664

[56] References Cited

U.S. PATENT DOCUMENTS

| | | | |
|---|---|---|---|
| 2,573,885 | 11/1951 | Whitman et al. | 354/64 |
| 3,860,937 | 1/1975 | Wolfe | 396/27 |
| 4,025,930 | 5/1977 | Wolff | 354/64 |
| 4,281,343 | 7/1981 | Monteiro | 354/64 X |
| 4,625,938 | 12/1986 | Brown | 354/74 X |
| 4,943,867 | 7/1990 | Suetaka et al. | 358/906 X |

*Primary Examiner*—David M. Gray
*Attorney, Agent, or Firm*—Robin, Blecker & Daley

[57] ABSTRACT

A waterproof case for housing a camera therein is provided with an operation part which is disposed on the waterproof case, and a signal transmission circuit which is arranged to transmit a signal output of the operation part to the camera housed in the waterproof case.

5 Claims, 3 Drawing Sheets

WATERPROOF CASE FOR CAMERA

This is a continuation application under 37 CFR 1.62 of prior application Ser. No. 08/166,806, filed Dec. 13, 1993, abandoned, which is a continuation of Ser. No. 07/815,079, filed Dec. 30, 1991, abandoned.

BACKGROUND OF THE INVENTION

1. Field of the Invention

This invention relates to a waterproof case arranged to permit a camera to be housed therein and to be operated from outside.

2. Description of the Related Art

Heretofore, various waterproof cases have been contrived for cameras to permit photographing underwater or in the rain. Generally, the waterproof case is shaped similarly to the camera to be housed in the waterproof case. The waterproof case is arranged either to have a part of it which abuts on the operation part of the camera formed with a flexible material, such as rubber or the like, or to have an operation part of it mechanically connected (or engaged) with the operation part of the camera, so that the camera housed in the waterproof case can be operated from outside.

However, with the waterproof case arranged in the above-stated manner, it is not easy to accurately operate the operation part of the camera. Besides, it is impossible to form the waterproof case into exactly the same shape as the camera. Thus, the degraded operability of the camera has been considered to be inevitable.

FIG. 1 of the accompanying drawings shows a waterproof case for a camera which has been proposed to solve the above-stated problem. Referring to FIG. 1, a camera 42 is provided with a jack 41 for remote control. A waterproof case 43 is arranged to house the camera 42 therein. The waterproof case 43 has an operation knob 44 arranged on the outside thereof. On the inside of the waterproof case 43 are provided a switch 45 which is arranged to sense any operation performed on the operation knob 44 and an electrical circuit board 46 which is arranged as necessary. The waterproof case 43 is provided further with a cable 47 and a plug 48 for connecting the switch 45 or the circuit board 46 to the jack 41. When the operation knob 44 is operated, the cable 47 and the plug 48 transmit a remote-control signal to the camera 42 through the jack 41, so that the camera 42 can be operated.

However, the above-stated waterproof case has the following shortcomings: (1) The cable and the plug are indispensable for remote-control signal transmission and thus cause an increase in cost. (2) In order to insert the plug into the jack of the camera, the cable must be longer than the length of the shortest transmission path. However, to prevent the free movement of the somewhat lengthy cable, the cable must be held in place either by structural arrangement or by some holding member, which generally not only causes an increase in cost but also requires time and labor in placing and removing the camera in and out of the waterproof case. (3) One end of the cable must be connected to the switch or the electrical circuit board either by means of a connector or by a surface-mounting soldering process, which also causes a cost increase. (4) In a case where a camera of different design is to be used in the waterproof case, the camera might become unusable, insofar as the operation on the camera is concerned, as the plug cannot be inserted into the remote-control jack just because the cable is too short or the cable cannot be held in place. (5) In designing a new camera with the use of this waterproof case taken into consideration, the amount of latitude allowable to the design and structural arrangement of the camera is restricted at least by the position of the remote-control jack which is narrowly limited.

SUMMARY OF THE INVENTION

This invention is directed to the solution of the above-stated problems. It is, therefore, an object of the invention to provide a waterproof case for a camera which is arranged to permit simplification of structural arrangement required for transmission of remote-control signals and also to ensure interchangeability of cameras to be housed therein.

To attain this object, a waterproof case for a camera arranged as a preferred embodiment of the invention is provided with a wireless remote controller which is of a waterproof structure and is capable of outputting and transmitting wireless remote-control signals for operating the camera housed in the waterproof case.

It is another object of the invention to provide a waterproof case for a camera which excels in operability and reliability and moreover allows a great amount of latitude to the design of the camera to be housed therein.

These and other objects and features of the invention will become apparent from the following detailed description of embodiments thereof taken in connection with the accompanying drawings.

DETAILED DESCRIPTION OF THE PREFERRED EMBODIMENTS

Figure 1:
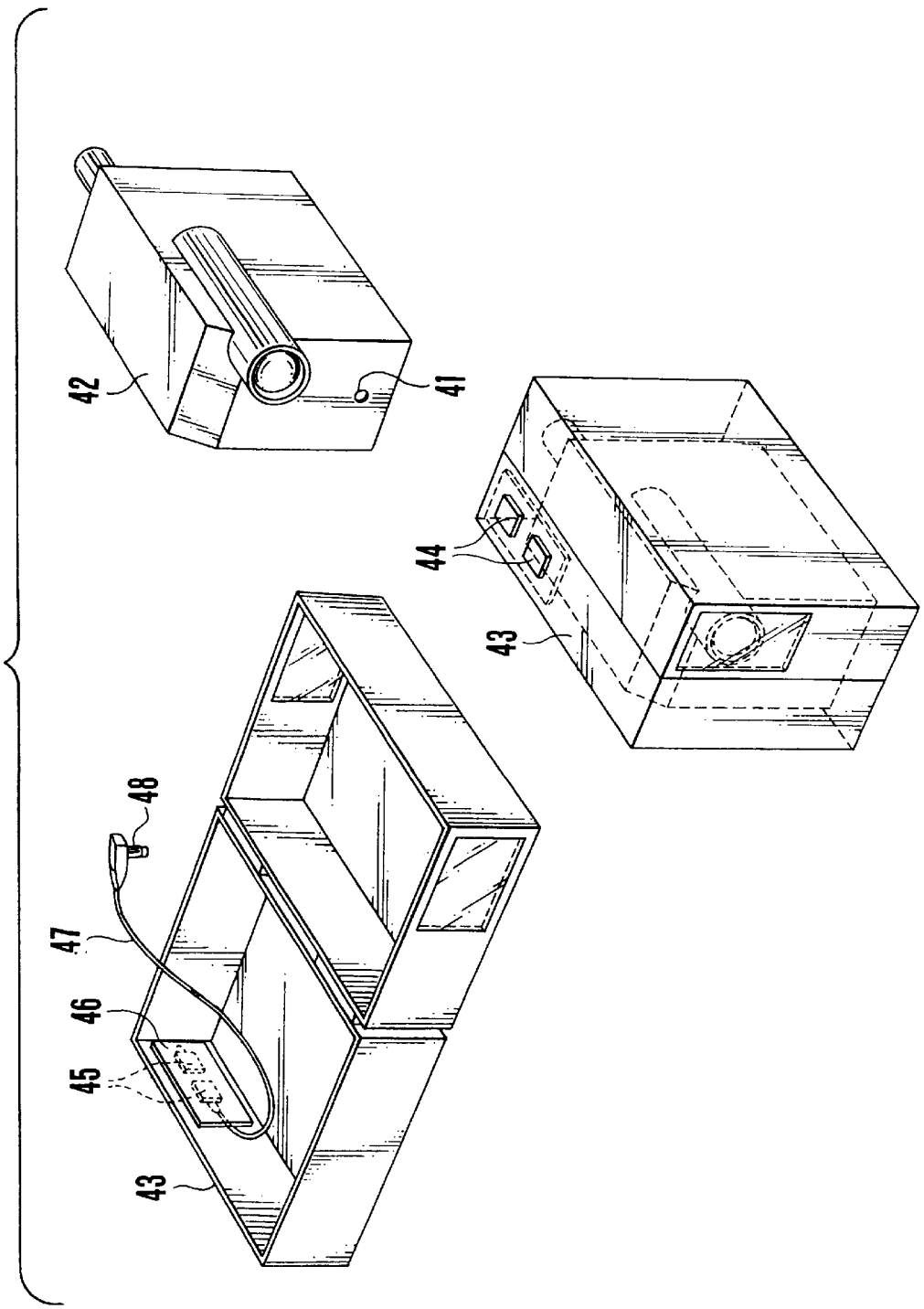
FIG. 1 is an oblique view showing the conventional waterproof case for a camera.
Figure 2:
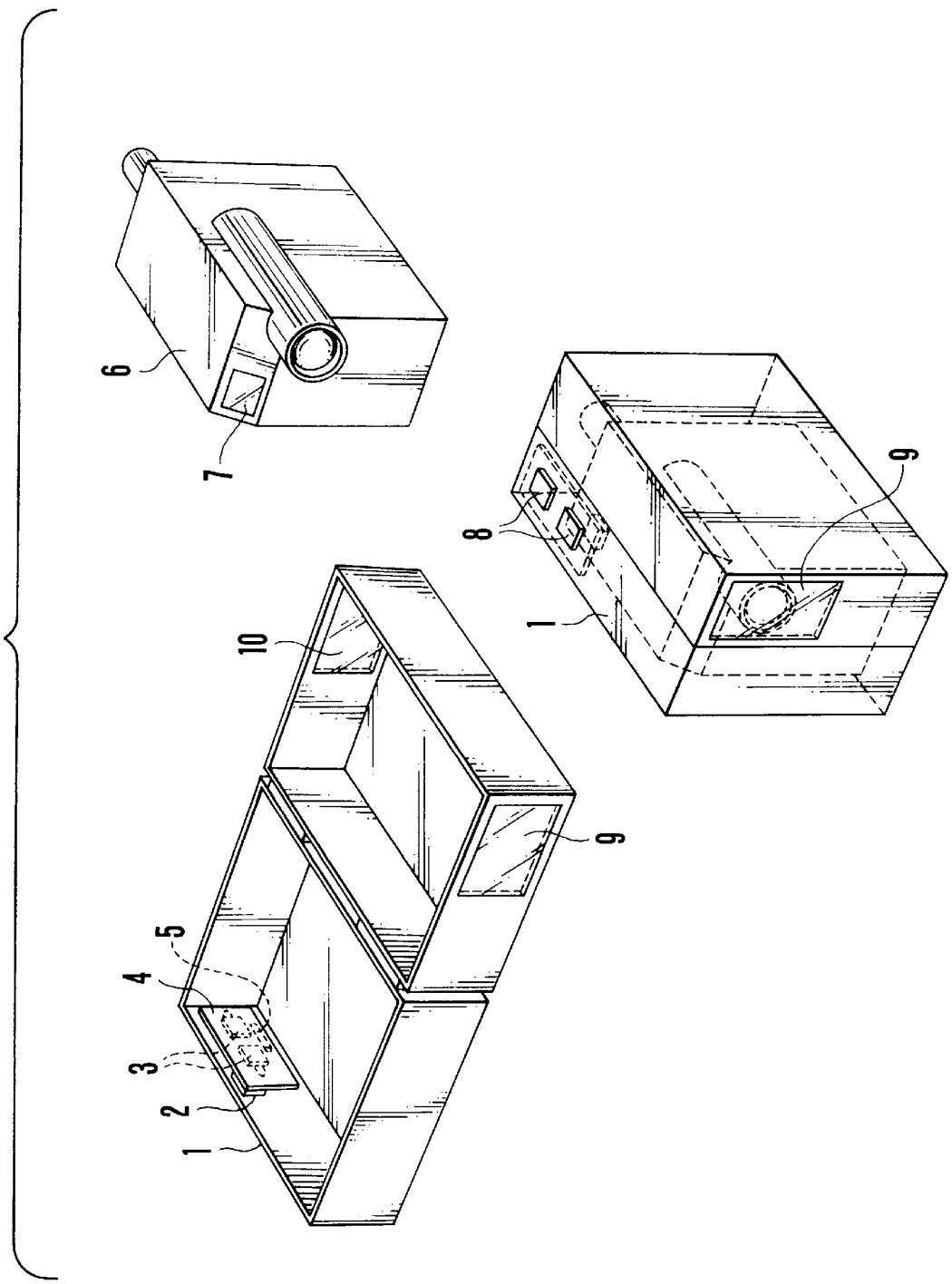
FIG. 2 is an oblique view showing an embodiment of this invention.

FIG. 2 shows in an oblique view an embodiment of this invention. Referring to FIG. 2, the illustration includes a waterproof case 1 for a camera; a signal transmission part 2 which is arranged to transmit signals for wireless remote control; a switch 3 which is arranged to detect any operation performed on an operation knob 8; an electrical circuit board 4; a battery 5 which serves as a power source; a camera 6 (or a camera-integrated type VCR which consists of a camera and a video tape recorder in one body) which is to be used while being housed in the waterproof case 1; a signal receiving part 7 for receiving the wireless remote-control signals; the operation knob 8; a light transmission window 9 for allowing external light to fall on the lens of the camera 6 housed in the waterproof case 1; another light transmission window 10 provided for a viewfinder.

When the switch 3 detects an action of the operation knob 8, a transmission signal is sent from the signal transmission part 2 through a signal processing operation of the electrical circuit board 4. The transmission signal is transmitted through an internal void space of the waterproof case 1 to be received by the signal receiving part 7. The camera 6 is operated according to the transmission signal. For the operation of the camera 6, no obstacle is allowed to be in the path of a light signal within the waterproof case 1 so as to cause the light signal to be guided to the signal receiving part 7 of the camera 6. For this purpose, a light-guiding reflection plate may be arranged in the waterproof case 1 according to the layout.

Figure 4:
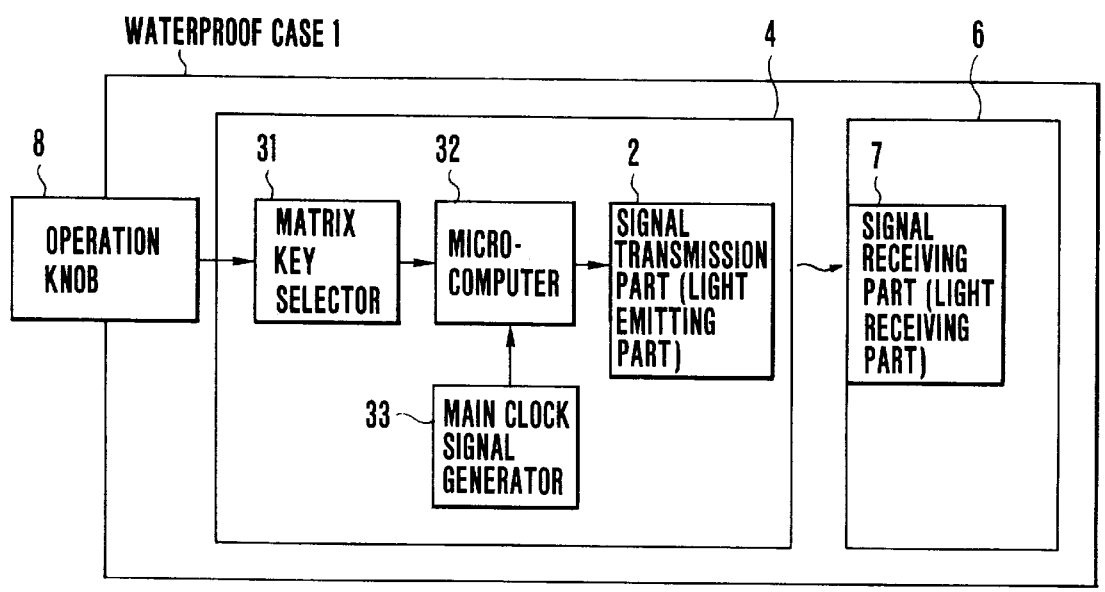
FIG. 4 is a block diagram showing the circuit of a remote controller arranged according to this invention.

FIG. 4 is a block diagram showing the circuit of a remote controller which is arranged according to this invention. Referring to FIG. 4, when the operation knob 8 is operated, a microcomputer 32 is caused to operate through a matrix key selector 31 at the timing of a main clock signal generator 33. The microcomputer 32 then causes the signal transmission part 2 to emit a light signal. The light signal is transmitted through an internal void space of the waterproof case 1 to be received by the signal receiving part (or a light receiving part) 7 which is disposed inside the camera 6. The camera 6 is operated according to the light signal received.

The arrangement shown in FIGS. 2 and 4 gives the following advantages: (1) The cable and the plug which have been used by the conventional waterproof case for transmission of the remote-control signal as mentioned in the foregoing become unnecessary. The arrangement thus permits a reduction in cost. The cable holding structure or the cable holding member is no longer required, so that the cost can be further reduced. The camera can be easily put into or taken out of the waterproof case. Work on the end of the cable is no longer necessary, so that the cost can be reduced still further. (2) In using a camera of different design and shape in the same waterproof case, the camera is operable as long as a slight amount of void space is available for the transmission path of remote-control signals between the signal transmission part and the signal receiving part. Therefore, most of the limitations that have heretofore been imposed by the design and the shape of the camera are removed. Any camera is usable so long as the camera can be housed in the waterproof case. Therefore, the universal applicability of the waterproof case to cameras can be increased. (3) In designing a new camera with the use of this waterproof case taken into consideration, the position of the signal receiving part of the camera can be almost freely decided to allow a great amount of latitude to the design and the structural arrangement of the camera.

Figure 3:
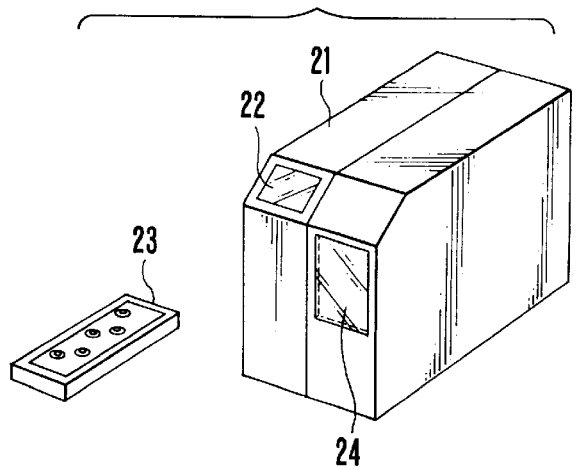
FIG. 3 is an oblique view showing another embodiment of this invention.

FIG. 3 shows another embodiment of the invention in an oblique view. The oblique view includes a waterproof case 21 for a camera; a light transmission part 22 for transmission of wireless remote-control signals; a wireless remote controller 23 which is of a waterproof structure; and a light transmission part 24 which is opposed to the lens of the camera. The camera is arranged in the same manner as the camera shown in FIG. 2.

When the wireless remote controller 23 is operated, a signal is transmitted from the wireless remote controller 23 to the signal receiving part 7 of the camera through the light transmission part 22 of the waterproof case 21. The camera is operated accordingly. The arrangement gives the following advantages: (1) No cable and no plug are required for transmitting remote-control signals. The advantages in this connection are the same as the embodiment shown in FIG. 2. (2) In addition to these advantages, the embodiment shown in FIG. 3 obviates the necessity of providing any operation knob on the waterproof case 21. A greater amount of latitude, therefore, can be allowed to the design and structural arrangement of the embodiment. With the exception of the wireless remote controller 23 of a waterproof structure, the cost of the body of the waterproof case thus can be greatly reduced. (3) The size of the light transmission part 22 can be freely determined between a minimum size that does not narrow the signal receiving range of the signal receiving part 7 of the camera and the size of the whole external shell of the waterproof case. With the size of the light transmission part 22 arranged to be sufficiently large, in using a camera of different design and shape while housing the camera in the same waterproof case, the waterproof case imposes a less amount of restriction on the position of the signal receiving part of the camera to permit the use of the camera so long as the camera can be housed in the waterproof case. Therefore, the universal applicability of the waterproof case to cameras can be increased. In manufacturing a new camera with the use of this waterproof case taken into consideration, the design and structural arrangement of the camera can be freely decided.

The waterproof case for a camera according to this invention is arranged to have the camera operated with wireless remote-control signals by providing the signal transmission part or the light transmission part for wireless transmission of the remote-control signals in the manner as described in the foregoing. The invented arrangement permits a reduction in manufacturing cost and also facilitates housing and removing the camera in and out of the waterproof case. Besides, the universal applicability of the waterproof case to cameras can be increased. It is also a great advantage of the invented arrangement that the design and structural arrangement of a new camera can be freely decided in connection with the use of the waterproof case.

What is claimed is:

1. A waterproof case structure for a camera not itself waterproof and having a remote controlled function, comprising:

a) a case of waterproof structure arranged to permit the camera not itself waterproof to be housed therein, said case being detachably attached to said camera;

b) an operating switch, provided on said case, being operable from outside of said case;

c) controller provided in said case, for generating a control signal corresponding to an operation of said switch; and d) a wireless transmitter part, provided in said case and to face to inside of said case and connected to said controller, for processing the control signal supplied from said controller and transmitting the processed control signal to inside of said case so as to control said camera housed in said case.

2. A waterproof case structure according to claim 1, wherein said wireless transmitter part is arranged to convert a control signal into a light signal and to transmit the light signal to a light receiving part of the camera housed in said case.

3. A waterproof case structure according to claim 2, wherein said case defines an interior transmission path for guiding the light signal from said wireless transmitter part to the light receiving part of the camera.

4. A waterproof camera system comprising:

a) a camera not itself waterproof having a remote controlled function;

b) a case of waterproof structure arranged to permit said camera to be housed therein, said case being detachably attached to said camera;

c) an operating switch provided on said case, being operable from outside of said case;

d) controller provided in said case, for generating a control signal corresponding to an operation of said switch; and e) a wireless transmitter part, provided in said case and to face to inside of said case and connected to said controller, for converting the control signal supplied from said controller to a light control signal and optically transmitting the light control signal to inside of said case so as to control said camera housed in said case by an optical wireless remote control.

5. A waterproof camera system according to claim 4, wherein said light control signal is an infrared ray.

* * * * *